US008848238B2

(12) United States Patent
Miyadera et al.

(10) Patent No.: US 8,848,238 B2
(45) Date of Patent: Sep. 30, 2014

(54) OPTICAL WRITING CONTROL DEVICE, IMAGE FORMING APPARATUS, AND OPTICAL WRITING CONTROL METHOD FOR CONTROLLING THE LIGHT EMITTING TIMING OF A LIGHT SOURCE

(71) Applicants: Tatsuya Miyadera, Kanagawa (JP); Motohiro Kawanabe, Osaka (JP); Masayuki Hayashi, Osaka (JP); Yoshinori Shirasaki, Osaka (JP); Hiroaki Ikeda, Osaka (JP); Akinori Yamaguchi, Osaka (JP); Tomohiro Ohshima, Osaka (JP)

(72) Inventors: Tatsuya Miyadera, Kanagawa (JP); Motohiro Kawanabe, Osaka (JP); Masayuki Hayashi, Osaka (JP); Yoshinori Shirasaki, Osaka (JP); Hiroaki Ikeda, Osaka (JP); Akinori Yamaguchi, Osaka (JP); Tomohiro Ohshima, Osaka (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/919,261

(22) Filed: Jun. 17, 2013

(65) Prior Publication Data

US 2014/0002564 A1 Jan. 2, 2014

(30) Foreign Application Priority Data

Jul. 2, 2012 (JP) ................................ 2012-148741

(51) Int. Cl.

| | |
|---|---|
| ***G06F 15/00*** | (2006.01) |
| ***G03G 13/01*** | (2006.01) |
| ***G03G 15/00*** | (2006.01) |
| ***G03G 13/04*** | (2006.01) |
| *H04N 1/40* | (2006.01) |
| *G03G 15/01* | (2006.01) |

(52) U.S. Cl.

CPC ........ *G03G 13/04* (2013.01); *G03G 2215/0161* (2013.01); *G03G 13/01* (2013.01); *G03G 15/011* (2013.01); *G03G 15/5058* (2013.01)

USPC .......................................... 358/1.5; 358/3.26

(58) Field of Classification Search

USPC ........ 358/1.2, 1.5, 1.9, 1.12, 1.14, 1.15, 3.26, 358/474, 505, 496, 497, 518, 534, 536, 358/525; 382/212, 284; 347/12, 14, 15, 347/116, 118, 238; 700/124

See application file for complete search history.

(56) References Cited

U.S. PATENT DOCUMENTS

| | | | | |
|---|---|---|---|---|
| 8,294,744 | B2 | 10/2012 | Kinoshita et al. | |
| 8,320,022 | B2 * | 11/2012 | Morishita et al. | ............ 358/3.09 |
| 8,411,124 | B2 | 4/2013 | Kinoshita et al. | |

(Continued)

FOREIGN PATENT DOCUMENTS

| | | |
|---|---|---|
| JP | 2004-191459 | 7/2004 |
| JP | 2007-088928 | 4/2007 |
| JP | 2012-061675 | 3/2012 |

*Primary Examiner* — Gabriel Garcia

(74) *Attorney, Agent, or Firm* — Oblon, Spivak, McClelland, Maier & Neustadt, L.L.P.

(57) ABSTRACT

An optical writing control device includes: a light emission control unit which controls light emission of multiple light sources for respective different colors and exposes multiple image carriers; and a correction amount calculating unit which calculates a correction amount for each of the different colors on the basis of a difference between a central value of a distribution range of positional deviation amounts in a sub-scanning direction for the respective different colors and the positional deviation amount for a corresponding color. The light emission control unit delays light emitting timing of a light source, which is to be delayed, by delaying reading timing of pixel information stored in a storage medium, and delays timing at which the pixel information about colors other than a color, light emitting timing of a light source for which is to be advanced, starts to be obtained from an image forming apparatus main body.

8 Claims, 12 Drawing Sheets

(56) References Cited

U.S. PATENT DOCUMENTS

2009/0267982 A1* 10/2009 Horii et al. ...................... 347/14
2012/0056961 A1* 3/2012 Kinoshita et al. ............. 347/118
2012/0062681 A1* 3/2012 Miyadera et al. ............. 347/116
2012/0288291 A1 11/2012 Miyadera

* cited by examiner

FIG.6

| | | |
|---|---|---|
| OVERALL TIMING REFERENCE VALUE | | XXX(sec) |
| TIMING REFERENCE VALUE OF EACH COLOR | | |
| | C | XXX(sec) |
| | M | XXX(sec) |
| | Y | XXX(sec) |
| | K | XXX(sec) |
| | . . . | |

FIG.10

$t_Y$_L1, $t_Y$_R1, $t_{BK}$_L1, $t_{BK}$_R1, $t_M$_L1, $t_M$_R1, $t_C$_L1, $t_C$_R1, $t_Y$_L2, $t_Y$_R2, $t_{BK}$_L2, $t_{BK}$_R2, $t_M$_L2, $t_M$_R2, $t_C$_L2, $t_C$_R2, $t_Y$_L3, $t_Y$_R3, $t_{BK}$_L3, $t_{BK}$_R3, $t_M$_L3, $t_M$_R3, $t_C$_L3, $t_C$_R3, $t_Y$_L4, $t_Y$_R4, $t_{BK}$_L4, $t_{BK}$_R4, $t_M$_L4, $t_M$_R4, $t_C$_L4, $t_C$_R4,

. . .

FIG.11

$d_Y$_L1, $d_Y$_R1, $d_{BK}$_L1, $d_{BK}$_R1, $d_M$_L1, $d_M$_R1, $d_C$_L1, $d_C$_R1, $d_Y$_L2, $d_Y$_R2, $d_{BK}$_L2, $d_{BK}$_R2, $d_M$_L2, $d_M$_R2, $d_C$_L2, $d_C$_R2, $d_Y$_L3, $d_Y$_R3, $d_{BK}$_L3, $d_{BK}$_R3, $d_M$_L3, $d_M$_R3, $d_C$_L3, $d_C$_R3, $d_Y$_L4, $d_Y$_R4, $d_{BK}$_L4, $d_{BK}$_R4, $d_M$_L4, $d_M$_R4, $d_C$_L4, $d_C$_R4,

. . .

FIG.12

$d_Y$_L, $d_Y$_R, $d_{BK}$_L, $d_{BK}$_R, $d_M$_L, $d_M$_R, $d_C$_L, $d_C$_R

FIG.13

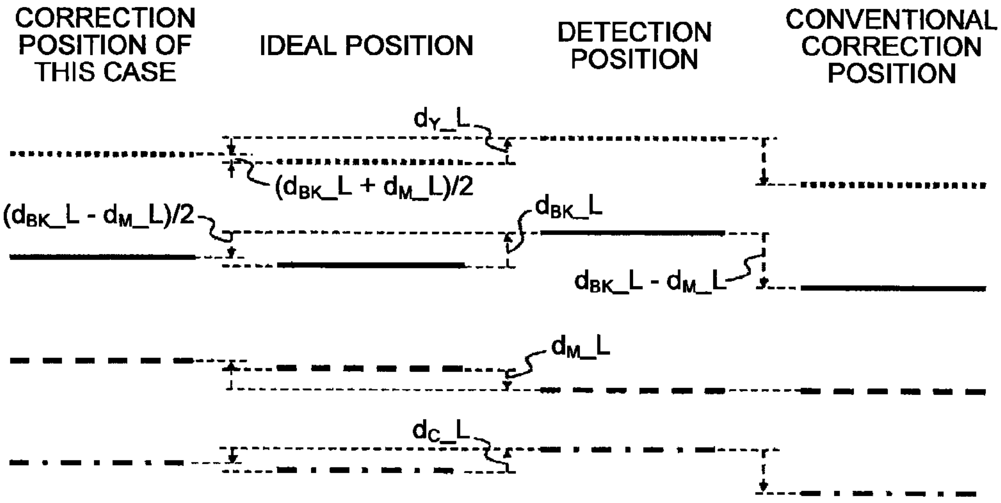

FIG.14

$P_V$_L
$P_V$_R

FIG.15

$\Delta d_Y$_L, $\Delta d_{BK}$_L, $\Delta d_M$_L, $\Delta d_C$_L
$\Delta$dY_R, $\Delta$dBK_R, $\Delta$dM_R, $\Delta$dC_R

FIG.16

EXAMPLE OF SKEW CORRECTION REMAINING DIFFERENCE

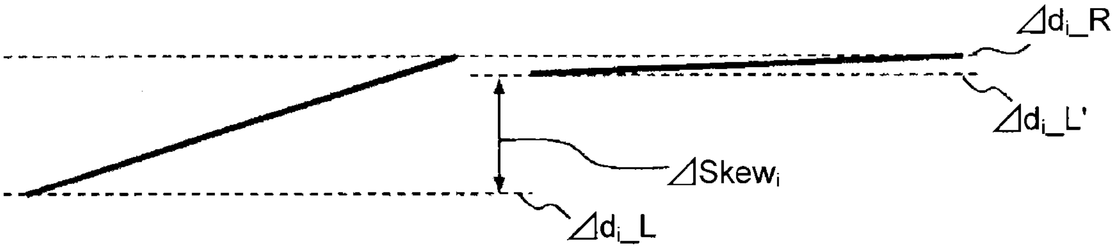

FIG.17

$\Delta Shift_Y$, $\Delta delay_Y$, $\Delta Skew_Y$ $\Delta Shift_{BK}$, $\Delta delay_{BK}$, $\Delta Skew_{BK}$ $\Delta Shift_M$, $\Delta delay_M$, $\Delta Skew_M$ $\Delta Shift_C$, $\Delta delay_C$, $\Delta Skew_C$

OPTICAL WRITING CONTROL DEVICE, IMAGE FORMING APPARATUS, AND OPTICAL WRITING CONTROL METHOD FOR CONTROLLING THE LIGHT EMITTING TIMING OF A LIGHT SOURCE

CROSS-REFERENCE TO RELATED APPLICATIONS

The present application claims priority to and incorporates by reference the entire contents of Japanese Patent Application No. 2012-148741 filed in Japan on Jul. 2, 2012.

BACKGROUND OF THE INVENTION

1. Field of the Invention

The present invention relates to an optical writing control device, an image forming apparatus, and an optical writing control method, and more particularly, the present invention relates to control of light emitting timing of a light source.

2. Description of the Related Art

In recent years, more and more information is made into electronic forms, and image processing apparatuses such as a scanner used to make documents into electronic forms and a printer and a facsimile used to output information made into electronic forms have become essential. Such image processing apparatus includes an image-capturing function, an image-forming function, a communication function, and/or the like, and is often constituted as an MFP that can be used as a printer, a facsimile, a scanner, and/or a copier.

Among such image processing apparatuses, an electrophotography image forming apparatus is widely used as an image forming apparatus used to output a document made into an electronic form. In an electrophotography image forming apparatus, an electrostatic latent image is formed by exposing a photosensitive element, and a developing agent such as toner is used to develop the electrostatic latent image to form a toner image, and the toner image is transferred onto a sheet, so that the paper is output.

In such electrophotography image forming apparatus, adjustment is made to form the image at a correct range on the sheet by synchronizing the timing for drawing the electrostatic latent image by exposing the photosensitive element and the timing for conveying the sheet. In a tandem image forming apparatus for forming a color image using multiple photosensitive elements, exposing timing of the photosensitive element of each color is adjusted so that the images developed at the photosensitive elements of the colors are correctly overlaid (for example, see Japanese Patent Laid-open No. 2004-191459). Hereinafter, such adjustment processing is collectively referred to as positional deviation correction.

An example of method for realizing the positional deviation correction such as described above includes a mechanical adjusting method of adjusting an arrangement relationship between a photosensitive element and a light source for exposing the photosensitive element and a method based on image processing of adjusting an image, which is to be output, in accordance with the positional deviation so as to ultimately form the image at a preferable position. In the method based on the image processing, the image is caused to be formed at a desired position by shifting the image, which is to be output, in a sub-scanning direction.

In order to realize the method based on the image processing such as described above, a line memory that holds information about pixels for controlling light emission of a light source for each of main scanning lines is prepared for multiple lines, and the image is shifted in the sub-scanning direction by adjusting the reading timing with which pixel information is read from the line memory. Accordingly, a control device for controlling the light source needs a line memory for the number of lines by which the image is to be shifted.

Here, in the case of the tandem image forming apparatus for forming a color image as described above, it is an object of the positional deviation correction to correct the positions of the images of the colors in the sub-scanning direction so that the images of the colors are correctly overlaid. Therefore, since the amount of shift of image is different depending on the light source provided in accordance with the photosensitive element of each color, the control device for controlling the light source of each color needs a different number of lines of the line memory.

In general, identical control units as many as the number of light sources are prepared and used in the control device for controlling the light sources. In a case of CMYK (Cyan, Magenta, Yellow, blacK), four light sources are provided so as to correspond to four photosensitive elements, and therefore, four control devices for controlling the light sources are prepared.

Here, the control devices of the colors need different number of lines in the line memory as described above, but it is not efficient to produce the control devices in accordance with the needed number of lines, and therefore, in many cases, it is common to provide a control device having a line memory for a number of lines with which a certain amount of shift can be made. As a result, depending on the amount of shift of each color, there may be useless line memories which are not used.

In view of the above, there is a need to reduce the number of lines of a line memory provided in an optical writing control device for controlling a light source in an electrophotography image forming apparatus having multiple light sources.

SUMMARY OF THE INVENTION

It is an object of the present invention to at least partially solve the problems in the conventional technology.

An optical writing control device forms electrostatic latent images on image carriers by controlling light sources exposing the image carriers. The optical writing control device includes: a pixel information obtaining unit which obtains pixel information about pixels constituting an image which is to be formed and output, from a control unit of an image forming apparatus main body, and stores the pixel information in a storage medium; a light emission control unit which controls light emission of each of the multiple light sources which are provided for respective different colors, on the basis of the obtained information about the pixels, and exposes the multiple image carriers which are provided for the respective different colors; a detection signal obtaining unit which obtains a detection signal of a sensor that detects an image in a conveying path on which the image obtained by developing the electrostatic latent images formed on the image carriers is transferred and conveyed; a detection timing obtaining unit which obtains, on the basis of the obtained detection signal, detection timing of a positional deviation correction pattern used to correct a positional deviation in a sub-scanning direction between the different colors of the image that is formed by developing the electrostatic latent images formed using the multiple image carriers; a positional deviation amount obtaining unit which obtains a positional deviation amount in the sub-scanning direction for each of the different colors, on the basis of a difference between a reference value determined in advance and the detection timing of the positional deviation correction pattern obtained for a corresponding color; and a correction amount calculating unit which calculates a central value of a distribution range of the positional deviation amounts in the sub-scanning direction obtained for the different colors, and calculates a correction amount for each of the different colors on the basis of a difference between the calculated central value and the positional deviation amount in the sub-scanning direction obtained for a corresponding color. The light emission control unit controls light emission of each of the multiple light sources on the basis of the calculated correction amount of each of the different colors. When a correction amount indicates that light emitting timing of a light source is to be delayed, the light emission control unit delays the light emitting timing of the light source by delaying reading timing of the pixel information stored in the storage medium. When a correction amount indicates that light emitting timing of a light source for a color is to be advanced, the light emission control unit delays timing at which the pixel information about colors other than the color starts to be obtained from the control unit of the image forming apparatus main body, thus relatively advancing the light emitting timing of the light source for the color.

An image forming apparatus includes such an optical writing control device.

An optical writing control method forms electrostatic latent images on image carriers by controlling light sources exposing the image carriers. The optical writing control method includes: obtaining a detection signal of a sensor that detects an image, in a conveying path on which the image obtained by developing the electrostatic latent images formed on the image carriers is transferred and conveyed; obtaining, on the basis of the obtained detection signal, detection timing of a positional deviation correction pattern used to correct a positional deviation in a sub-scanning direction between different colors of the image that is formed by developing the electrostatic latent images formed on the multiple image carriers provided for the different colors; obtaining a positional deviation amount in the sub-scanning direction for each of the different colors, on the basis of a difference between a reference value determined in advance and the detection timing of the positional deviation correction pattern obtained for a corresponding color; and calculating a central value of a distribution range of the positional deviation amounts in the sub-scanning direction obtained for the different colors, and calculates a correction amount for each of the different colors on the basis of a difference between the calculated central value and the positional deviation amount in the sub-scanning direction obtained for a corresponding color. When a correction amount indicates that light emitting timing of a light source is to be delayed, the light emitting timing of the light source is delayed by delaying reading timing of pixel information stored in the storage medium used to obtain and store pixel information about pixels constituting the image which is to be formed and output. When the correction amount indicates that light emitting timing of a light source for a color is to be advanced, timing at which the pixel information about colors other than the color starts to be stored in the storage medium is delayed, and thus the light emitting timing of the light source for the color is relatively advanced.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a figure illustrating an example of information stored in a reference value storage unit according to an embodiment of the present invention;

FIG. 10 is a figure illustrating an example of counted value concerning pattern detection timing according to an embodiment of the present invention;

FIG. 11 is a figure illustrating a calculation result of a deviation amount according to an embodiment of the present invention;

FIG. 12 is a figure illustrating a result of averaging of the deviation amounts according to an embodiment of the present invention;

FIG. 13 is a figure illustrating a positional deviation correction mode according to an embodiment of the present invention;

FIG. 14 is a figure illustrating a calculation result of a central value according to an embodiment of the present invention;

FIG. 15 is a figure illustrating a calculation result of a deviation amount from the central value according to an embodiment of the present invention;

FIG. 16 is a figure illustrating an example of a skew correction remaining difference according to an embodiment of the present invention;

FIG. 17 is a figure illustrating an example of correction value stored in a correction value storage unit according to an embodiment of the present invention;

DETAILED DESCRIPTION OF THE PREFERRED EMBODIMENTS

Hereinafter, an embodiment of the present invention will be explained in detail with reference to drawings. In the present embodiment, an image forming apparatus serving as a multifunction peripheral (MFP) will be explained as an example. The image forming apparatus according to the present embodiment is an electrophotography image forming apparatus, and the gist thereof is detailed processing for adjusting a position in a sub-scanning direction where a toner image developed on a photosensitive element serving as an image carrier is transferred.

Figure 1:
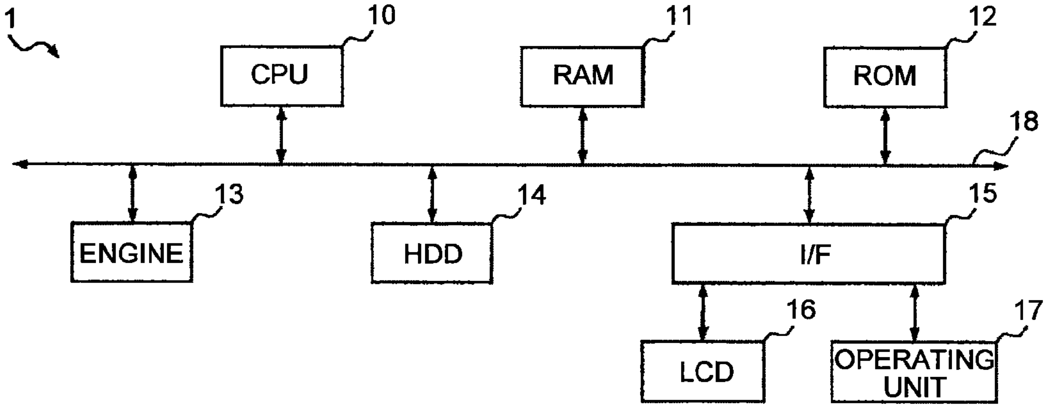
FIG. 1 is a block diagram illustrating a hardware configuration of an image forming apparatus according to an embodiment of the present invention.

FIG. 1 is a block diagram illustrating a hardware configuration of an image forming apparatus 1 according to the present embodiment. As illustrated in FIG. 1, the image forming apparatus 1 according to the present embodiment includes an engine for executing image-forming process in addition to the configuration like an information processing terminal such as a generally-available server and PC (Personal Computer). More specifically, the image forming apparatus 1 according to the present embodiment includes a CPU (Central Processing Unit) 10, a RAM (Random Access Memory) 11, a ROM (Read Only Memory) 12, an engine 13, an HDD (Hard Disk Drive) 14, and an I/F 15, which are connected via a bus 18. The I/F 15 is connected to an LCD (Liquid Crystal Display) 16 and an operating unit 17.

The CPU 10 is a calculating unit, and controls the entire operation of the image forming apparatus 1. The RAM 11 is a volatile storage medium capable of reading and writing information at a high speed, and is used as a work area when the CPU 10 processes the information. The ROM 12 is a read-only nonvolatile storage medium, and stores programs such as firmware. The engine 13 is a mechanism for actually executing image-forming process in the image forming apparatus 1.

The HDD 14 is a non-volatile storage medium capable of reading and writing information, and stores an OS (Operating System), various control programs and application programs, and the like. The I/F 15 connects various kinds of hardware, a network, and the like to the bus 18 and controls them. The LCD 16 is a visual user interface for checking the state of the image forming apparatus 1 by the user. The operating unit 17 is a user interface, such as a keyboard and a mouse, for inputting information to the image forming apparatus 1 by the user.

In such hardware configuration, the programs stored in the storage medium such as an optical disk, not illustrated, or the ROM 12 or the HDD 14 are read to the RAM 11, and the CPU 10 performs computation in accordance with the programs, which constitute software control units. Functional blocks realizing the functions of the image forming apparatus 1 according to the present embodiment are made with the combination of the hardware and the software control units thus configured.

Figure 2:
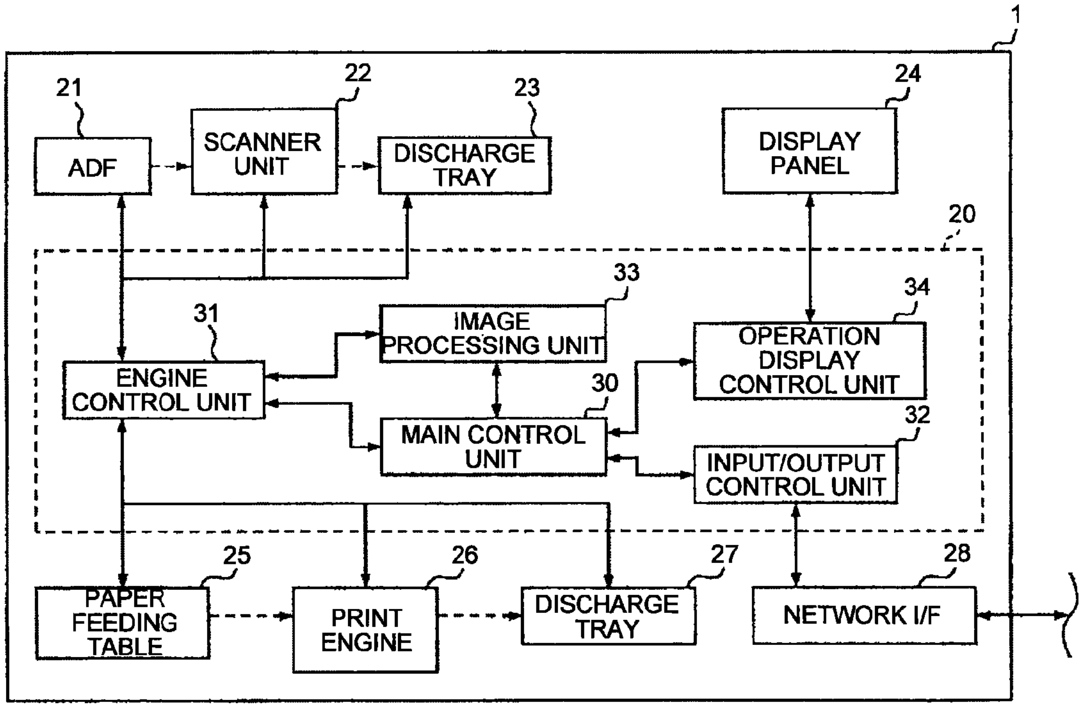
FIG. 2 is a figure illustrating a functional configuration of an image forming apparatus according to an embodiment of the present invention.

Subsequently, the functional configuration of the image forming apparatus 1 according to the present embodiment will be explained with reference to FIG. 2. FIG. 2 is a block diagram illustrating a functional configuration of the image forming apparatus 1 according to the present embodiment. As illustrated in FIG. 2, the image forming apparatus 1 according to the present embodiment includes a controller 20, an ADF (Auto Document Feeder) 110, a scanner unit 22, a discharge tray 23, a display panel 24, a paper feeding table 25, a print engine 26, a discharge tray 27, and a network I/F 28.

The controller 20 includes a main control unit 30, an engine control unit 31, an input/output control unit 32, an image processing unit 33, and an operation display control unit 34. As illustrated in FIG. 2, the image forming apparatus 1 according to the present embodiment is made as an MFP having the scanner unit 22 and the print engine 26. In FIG. 2, an electric connection is denoted by an arrow of a solid line, and a flow of a sheet is denoted by an arrow of a broken line.

The display panel 24 is an output interface for visually displaying the state of the image forming apparatus 1, and is also an input interface (operating unit) serving as a touch panel with which the user directly manipulates the image forming apparatus 1 or inputs information to the image forming apparatus 1. The network I/F 28 is an interface with which the image forming apparatus 1 communicates with another device via a network. Ethernet (registered trademark) and a USB (Universal Serial Bus) interface are used as the network I/F 28.

The controller 20 is made by a combination of software and hardware. More specifically, the control programs such as firmware stored in the nonvolatile storage medium such as an optical disk and the HDD 14, the ROM 12, and the nonvolatile memory are loaded to volatile memory (hereinafter, memory) such as the RAM 11, and the controller 20 is constituted by hardware such as an integrated circuit and the software control units constituted by computation performed by the CPU 10 in accordance with the programs. The controller 20 functions as a control unit for controlling the entire image forming apparatus 1.

The main control unit 30 plays a role of controlling each unit included in the controller 20, and gives commands to each unit of the controller 20. The engine control unit 31 plays a role of a driving unit for controlling or driving the print engine 26, the scanner unit 22, and the like. The input/output control unit 32 gives signals and commands, which are input via the network I/F 28, to the main control unit 30. The main control unit 30 controls the input/output control unit 32, and accesses other devices via the network I/F 28.

The image processing unit 33 generates drawing information based on print information included in the received print job in accordance with the control by the main control unit 30. This drawing information is information according to which the print engine 26 which is the image-forming unit draws an image which is to be formed in image-forming operation. The print information included in the print job is image information converted into a format which can be recognized by the image forming apparatus 1, by a printer driver installed in the information processing device such as a PC. The operation display control unit 34 notifies the main control unit 30 of information which is input via the display panel 24 or display information on the display panel 24.

When the image forming apparatus 1 operates as a printer, first, the input/output control unit 32 receives a print job via the network I/F 28. The input/output control unit 32 transfers the received print job to the main control unit 30. When the main control unit 30 receives the print job, the main control unit 30 controls the image processing unit 33 to generate drawing information on the basis of the print information included in the print job.

When the image processing unit 33 generates the drawing information, the engine control unit 31 controls the print engine 26 on the basis of the generated drawing information, and executes image-forming process on a sheet conveyed from the paper feeding table 25. That is, the print engine 26 functions as an image-forming unit. A document on which an image is formed by the print engine 26 is discharged to the discharge tray 27.

When the image forming apparatus 1 operates as a scanner, the operation display control unit 34 or the input/output control unit 32 transfers a scan execution signal to the main control unit 30, in accordance with a scan execution command which is input from an external PC or the like via the network I/F 28 or operation performed by the user with the display panel 24. The main control unit 30 controls the engine control unit 31 on the basis of the received scan execution signal.

The engine control unit 31 drives an ADF 21, and conveys the document to be captured, which is set on the ADF 21, to the scanner unit 22. The engine control unit 31 drives the scanner unit 22, and captures the image of the document conveyed from the ADF 21. When no document is set on the ADF 21, and a document is directly set on the scanner unit 22, the scanner unit 22 captures the image of the document in accordance with the control of the engine control unit 31. That is, the scanner unit 22 operates as an image capturing unit.

In the image capturing operation, an image capturing device such as a CCD included in the scanner unit 22 optically scans the document, and generates captured image information which is generated on the basis of the optical information. The engine control unit 31 transfers the captured image information generated by the scanner unit 22 to the image processing unit 33. In accordance with the control of the main control unit 30, the image processing unit 33 generates image information on the basis of the captured image information received from the engine control unit 31. The image information generated by the image processing unit 33 is stored in a storage medium attached to the image forming apparatus 1 such as an HDD 40. That is, the scanner unit 22, the engine control unit 31, and the image processing unit 33 cooperate with each other and function as a document reading unit.

The image information generated by the image processing unit 33 is stored in the HDD 40 or the like as it is, in accordance with a command given by the user, or transmitted to an external device via the input/output control unit 32 and the network I/F 28. That is, the ADF 21 and the engine control unit 31 function as an image input unit.

When the image forming apparatus 1 operates as a copier, the image processing unit 33 generates drawing information on the basis of captured image information received by the engine control unit 31 from the scanner unit 22 or the image information generated by the image processing unit 33. The engine control unit 31 drives the print engine 26 just like the case of the printer operation, on the basis of the drawing information.

Figure 3:
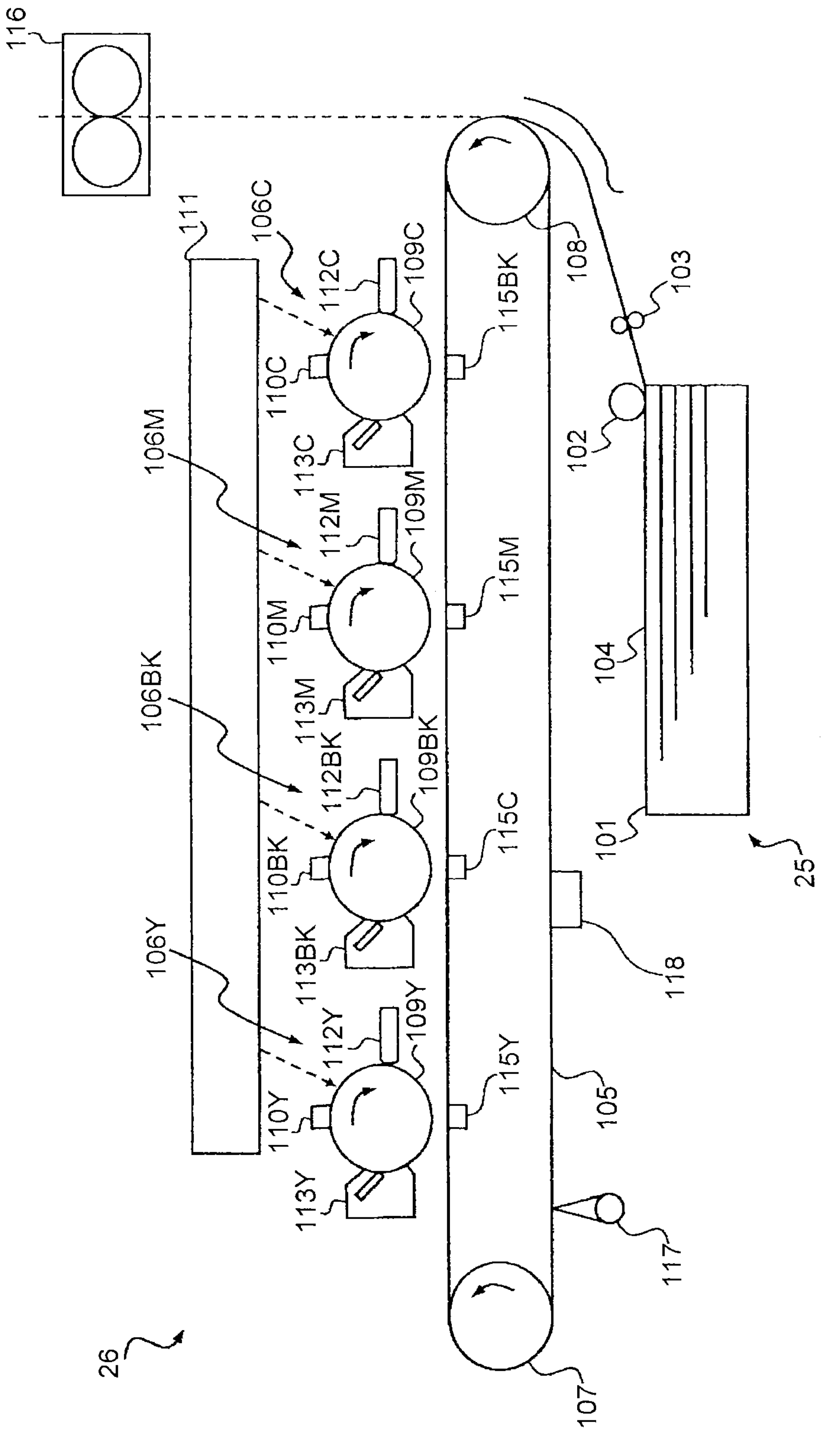
FIG. 3 is a figure illustrating a configuration of a print engine according to an embodiment of the present invention.

Subsequently, the configuration of the print engine 26 according to the present embodiment will be explained with reference to FIG. 3. As illustrated in FIG. 3, the print engine 26 according to the present embodiment has a so-called tandem configuration in which the image-forming units 106 of the colors are arranged along a conveying belt 105 which is an endless moving unit. More specifically, multiple image-forming units (electrophotography processing units) 106C, 106M, 106BK, 106Y (hereinafter collectively referred to as an image-forming unit 106) are arranged along the conveying belt 105 from the upstream in the conveying direction of the conveying belt 105. The conveying belt 105 is an intermediate transfer belt on which an intermediate transfer image to be transferred onto a sheet (an example of a recording medium) 104 which is separated and fed from a paper feed tray 101 with a paper feeding roller 102 is formed.

The sheet 104 fed from the paper feed tray 101 is once stopped by a registration roller 103, and in accordance with image-forming timing of the image-forming unit 106, the sheet 104 is fed to the transfer position of the image from the conveying belt 105.

Multiple image-forming units 106C, 106M, 106BK, 106Y have the same internal configuration except that they are different in the color of a formed toner image. The image-forming unit 106BK forms a black image. The image-forming unit 106M forms a magenta image. The image-forming unit 106C forms a cyan image. The image-forming unit 106Y forms a yellow image. In the explanation below, the image-forming unit 106BK will be explained more specifically. But the other image-forming units 106M, 106C, 106Y are similar to the image-forming unit 106BK, and therefore, reference numerals distinguished by M, C, Y of the constituent elements of the image-forming units 106M, 106C, 106Y are illustrated in the figures instead of “BK” which is attached to each constituent element of the image-forming unit 106BK, and description thereabout is omitted.

The conveying belt 105 is an endless belt stretched between a driving roller 107, which is rotationally driven, and a driven roller 108. The driving roller 107 is rotationally driven by a driving motor, not illustrated. The driving motor, the driving roller 107, and the driven roller 108 function as a driving unit for moving the conveying belt 105 which is an endless moving unit.

During image-forming process, the first image-forming unit 106C transfers a cyan toner image onto the conveying belt 105 that is rotationally driven. The image-forming unit 106C includes a photosensitive drum 109C serving as a photosensitive element, a charger 110C arranged around the photosensitive drum 109C, an optical writing device 200, a developing unit 112C, a photosensitive element cleaner (not illustrated), and a discharger 113C. The optical writing device 200 is configured to emit light onto each of the photosensitive drums 109C, 109M, 109BK, 109Y (hereinafter collectively referred to as “photosensitive drum 109”).

During image-forming process, the external peripheral surface of the photosensitive drum 109C is uniformly charged by the charger 110C in darkness, and thereafter, writing process is done using light from the light source corresponding to the cyan image emitted by the optical writing device 200, thus an electrostatic latent image is formed. The developing unit 112C makes the electrostatic latent image into a visible image with cyan toner, and accordingly, the cyan toner image is formed on the photosensitive drum 109C.

At a position (transfer position) at which the photosensitive drum 109C and the conveying belt 105 are in contact with each other or are closest to each other, this toner image is transferred onto the conveying belt 105 with action of a transfer device 115C. In this transfer process, the image using the cyan toner is formed on the conveying belt 105. The photosensitive element cleaner removes unnecessary toner remaining on the external peripheral surface of the photosensitive drum 109C which has finished the transfer process of the toner image, and thereafter, the discharger 113C removes electric charge from the photosensitive drum 109C. Then, the photosensitive drum 109C waits for a subsequent image-forming process.

In the manner described above, the cyan toner image which is transferred onto the conveying belt 105 by the image-forming unit 106C is conveyed to the subsequent image-forming unit 106M by driving the conveying belt 105 by the roller. With the process like the image-forming process in the image-forming unit 106C, the image-forming unit 106M forms a magenta toner image on the photosensitive drum 109M, and the toner image is transferred in such a manner that it is overlaid on the cyan image which has already been formed.

The cyan and magenta toner image transferred onto the conveying belt 105 is further conveyed to the subsequent image-forming units 106C, 106Y. With the like operation, the black toner image formed on the photosensitive drum 109BK and the yellow toner image formed on the photosensitive drum 109Y are transferred in such a manner that they are overlaid on the image that is already transferred. Thus, a full color intermediate transfer image is formed on the conveying belt 105.

The sheets 104 contained in the paper feed tray 101 are fed in such an order that the sheet 104 at the top is fed first, and at the position at which the conveying path is in contact with or closest to the conveying belt 105, the intermediate transfer image formed on the conveying belt 105 is transferred onto the sheet. Thus, an image is formed on the sheet 104. The sheet 104 on which the image is formed thereon is further conveyed, and the image is fixed by a fixing unit 116, and thereafter, the sheet 104 is discharged to the outside of the image forming apparatus.

In the image forming apparatus 1, because of error in the distance between the shafts of the photosensitive drums 109BK, 109M, 109C and 109Y, error in parallelism between the photosensitive drums 109BK, 109M, 109C and 109Y, error in the installation of the light source in an optical writing device 111, error in the writing timing of the electrostatic latent images to the photosensitive drums 109BK, 109M, 109C and 109Y, and the like, the toner images of the colors may be not overlaid at the position where they are should be overlaid, and positional deviation may occur between the colors.

Because of the similar reason, on the sheet on which an image is to be transferred, the image may be transferred to a range outside of the range where the image should be transferred. Known examples of components of such positional deviation mainly include skew, and registration deviation in the sub-scanning direction. Expansion and contraction of the conveying belt due to change in the temperature in the device and/or time degradation is also known.

In order to correct such positional deviation, pattern detection sensors 117 are provided. The pattern detection sensor 117 is an optical sensor for reading a positional deviation correction pattern transferred onto the conveying belt 105 by the photosensitive drums 109BK, 109M, 109C and 109Y, and includes a light emission device for emitting light to a correction pattern drawn on the surface of the conveying belt 105 and a light receiving device for receiving light reflected by the correction pattern.

As illustrated in FIG. 3, the pattern detection sensors 117 are supported by the same substrate along a direction perpendicular to the conveying direction of the conveying belt 105 at the downstream of the photosensitive drums 109BK, 109M, 109C and 109Y. The details of the pattern detection sensor 117 and the modes of positional deviation correction and gray level correction will be explained later in detail. It should be noted that any of the positional deviation correction is correction for correcting the operation for forming and developing an electrostatic latent image with the photosensitive drums 109BK, 109M, 109C and 109Y, and is more specifically correction for correcting parameters for the operation of drawing the images, which will be hereinafter collectively referred to as drawing parameter correction.

In such drawing parameter correction, a belt cleaner 118 is provided in order to remove the toner of the correction pattern drawn on the conveying belt 105 and prevent the sheet conveyed by the conveying belt 105 from getting smears. As illustrated in FIG. 3, the belt cleaner 118 is a cleaning blade which is pressed against the conveying belt 105 at the downstream with respect to the pattern detection sensor 117 but the upstream with respect to the photosensitive drum 109, and is a developing agent removing unit for scraping off the toner attached to the surface of the conveying belt 105.

Figure 4:
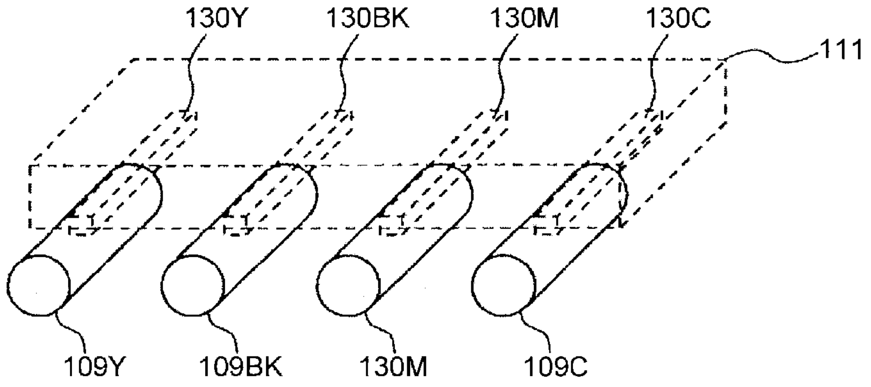
FIG. 4 is a figure illustrating a configuration of an optical writing device according to an embodiment of the present invention.

Subsequently, the optical writing device 111 according to the present embodiment will be explained. FIG. 4 is a figure illustrating arrangement relationship between the photosensitive drum 109 and the optical writing device 111 according to the present embodiment. As illustrated in FIG. 4, light emitted onto the photosensitive drums 109BK, 109M, 109C, 109Y are emitted by LEDAs (Light-emitting diode Array) 130BK, 130M, 130C, 130Y (hereinafter collectively referred to as LEDA 130) which are light sources.

The LEDA 130 is made by arranging the LEDs, which are light emitting devices, in the main-scanning direction of the photosensitive drum 109. The control unit included in the optical writing device 111 controls, for each main scanning line, the ON/OFF state of each of the LEDs arranged in the main-scanning direction on the basis of drawing information received from the controller 20, thereby selectively exposing the surface of the photosensitive drum 109, and forming the electrostatic latent image.

Figure 5:
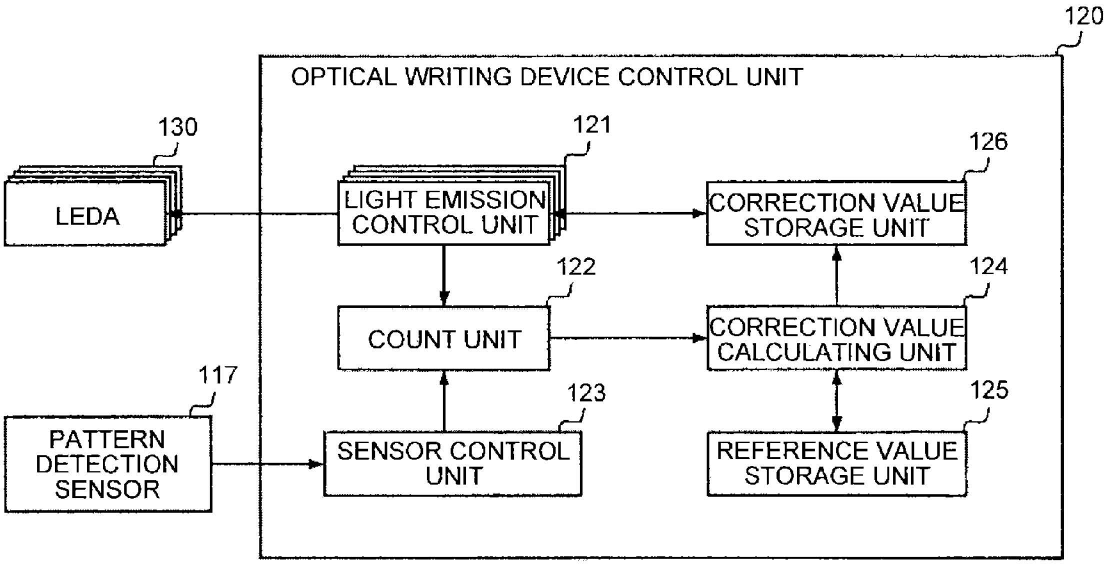
FIG. 5 is a block diagram illustrating a configuration of an optical writing control unit and LEDA according to an embodiment of the present invention.

Subsequently, control blocks of the optical writing device 111 according to the present embodiment will be explained with reference to FIG. 5. FIG. 5 illustrates the functional configuration of an optical writing device control unit 120 for controlling the optical writing device 111 according to the present embodiment and connection relationship between the LEDA 130 and the pattern detection sensor 117.

As illustrated in FIG. 5, the optical writing device control unit 120 according to the present embodiment includes a light emission control unit 121, a count unit 122, a sensor control unit 123, a correction value calculating unit 124, a reference value storage unit 125, and a correction value storage unit 126. It should be noted that the optical writing device 111 according to the present embodiment includes an information processing mechanism such as the CPU 10, the RAM 11, the ROM 12, and the HDD 14 as explained in FIG. 1. Like the controller 20 of the image forming apparatus 1, the optical writing device control unit 120 as illustrated in FIG. 5 is configured such that the control program stored in the ROM 12 or the HDD 14 is loaded to the RAM 11, and the optical writing device control unit 120 operates in accordance with the control of the CPU 10.

The light emission control unit 121 is a light source control unit for controlling the LEDA 130 on the basis of the image information received from the engine control unit 31 of the controller 20. That is, the light emission control unit 121 also functions as a pixel information acquisition unit. The light emission control unit 121 drives the LEDA 130 on the basis of the drawing information which is input from the engine control unit 31, and in addition, in order to draw a correction pattern in the above drawing parameter correction processing, the light emission control unit 121 controls light emission of the LEDA 130.

As explained in FIG. 4, multiple LEDAs 130 are provided in association with the colors. Therefore, as illustrated in FIG. 5, multiple light emission control units 121 are provided in association with the multiple LEDAs 130. A correction value generated as a result of the positional deviation correction processing in the drawing parameter correction processing is stored as a positional deviation correction value in the correction value storage unit 126 as illustrated in FIG. 5. The light emission control unit 121 corrects the timing with which the LEDA 130 is driven, on the basis of the positional deviation correction value stored in the correction value storage unit 126.

The correction of driving timing of the LEDA 130 by the light emission control unit 121 is achieved by, more particularly, delaying, in units of one line cycle, the timing of light emission driving of the LEDA 130, or shifting the line on the basis of the drawing information input from the engine control unit 31. In contrast, drawing information is successively input from the engine control unit 31 in accordance with predetermined cycle, and therefore, in order to delay the light emitting timing to shift the line, it is necessary to hold the received drawing information and delay the reading timing.

Accordingly, the light emission control unit 121 has a line memory which is a storage medium for holding drawing information which is input for every main scanning line, and holds the drawing information which is input from the engine control unit 31 by storing it in the line memory. It is the gist of the present embodiment to reduce the capacity of the line memory to the minimum possible level.

In the positional deviation correction processing, the count unit 122 starts counting as soon as the light emission control unit 121 controls the LEDA 130 to start exposure of the photosensitive drum 109BK. The count unit 122 obtains the detection signal which the sensor control unit 123 outputs when detecting the positional deviation correction pattern on the basis of the output signal of the pattern detection sensor 117, and inputs the counted value at the timing into the correction value calculating unit 124. That is, the count unit 122 functions as a detection timing obtaining unit for obtaining the detection timing of the pattern.

The sensor control unit 123 is a control unit for controlling the pattern detection sensor 117, and as described above, on the basis of the output signal of the pattern detection sensor 117, the sensor control unit 123 outputs a detection signal when it determines that the positional deviation correction pattern formed on the conveying belt 105 reaches the position of the pattern detection sensor 117. That is, the sensor control unit 123 functions as a detection signal obtaining unit for obtaining the detection signal of the pattern from the pattern detection sensor 117.

The correction value calculating unit 124 calculates a correction value on the basis of the counted value obtained from the count unit 122 and on the basis of a positional deviation correction reference value stored in the reference value storage unit 125. That is, the correction value calculating unit 124 functions as a reference value obtaining unit and a correction value calculating unit. FIG. 6 illustrates an example of reference values stored in the reference value storage unit 125. As illustrated in FIG. 6, the reference value storage unit 125 stores an overall timing reference value, a timing reference value of each color, and the like.

The overall timing reference value is a reference value for a period from when the light emission control unit 121 controls the LEDA 130 to start exposure of the photosensitive drum 109 to when the pattern detection sensor 117 detects the positional deviation correction pattern. More specifically, the correction value calculating unit 124 compares a write start timing reference value and the counted value counted by the count unit 122, and calculates a correction value for correcting overall deviation of the image in the sub-scanning direction on the basis of the deviation between the both.

The timing reference value of each color is a reference value for the detection timing of the correction pattern for each of CMYK colors drawn by the photosensitive drum 109, and as illustrated in FIG. 6, the timing reference value is defined for each of the CMYK colors. More specifically, the correction value calculating unit 124 compares the timing reference value of each color with the counted value counted by the count unit 122 with regard to the timing with which the correction pattern drawn by the photosensitive drum 109 of each color is detected, and calculates a correction value for correcting the deviation of the drawing timing in the photosensitive drum 109 of each color.

In FIG. 6, the overall timing reference value and the timing reference value of each color are represented by a time period using (sec) as the unit, but this is merely an example. Alternatively, for example, a conveying distance of the conveying belt 105 during that period, the number of clocks of a reference clock or the like may be used. The optical writing device control unit 120 according to the present embodiment not only has the functional configuration as illustrated in FIG. 6 but also has a function of controlling the driving roller 107 for rotating the conveying belt 105 and a function of controlling the belt cleaner 118.

Figure 7:
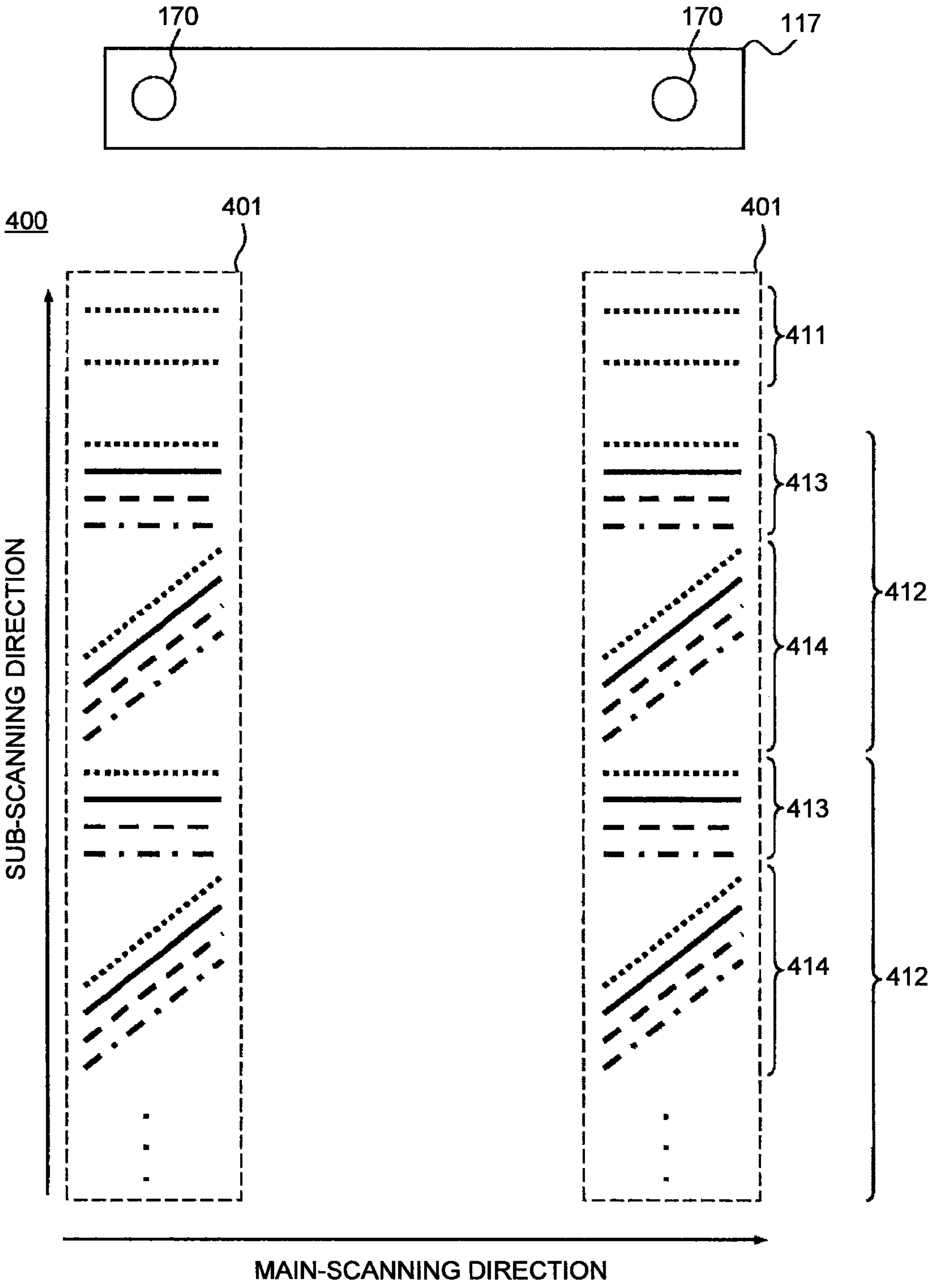
FIG. 7 is a figure illustrating an example of positional deviation correction pattern according to an embodiment of the present invention.

Subsequently, the positional deviation correction operation according to the present embodiment will be explained. FIG. 7 is a figure illustrating a mark drawn on the conveying belt 105 by the LEDA 130 controlled by the light emission control unit 121 (hereinafter referred to as a positional deviation correction mark) in the positional deviation correction operation according to the present embodiment.

As illustrated in FIG. 7, a positional deviation correction mark 400 according to the present embodiment is configured such that multiple positional deviation correction pattern rows 401 including various patterns arranged in the sub-scanning direction are arranged in the main-scanning direction (in the present embodiment, two positional deviation correction pattern rows 401 are arranged). In FIG. 7, a solid line denotes a pattern drawn by the photosensitive drum 109BK. A dotted line denotes a pattern drawn by the photosensitive drum 109Y. A broken line denotes a pattern drawn by the photosensitive drum 109C. An alternate long and short dash line denotes a pattern drawn by the photosensitive drum 109M.

As illustrated in FIG. 7, the pattern detection sensor 117 includes multiple sensor devices 170 in the main-scanning direction (in the present embodiment, the pattern detection sensor 117 includes two sensor devices 170), and the positional deviation correction pattern rows 401 are drawn at the respective positions corresponding to the sensor devices 170. Accordingly, the optical writing control unit 120 can detect the patterns at multiple positions in the main-scanning direction, and can correct the skew of the image drawn.

Figure 8:
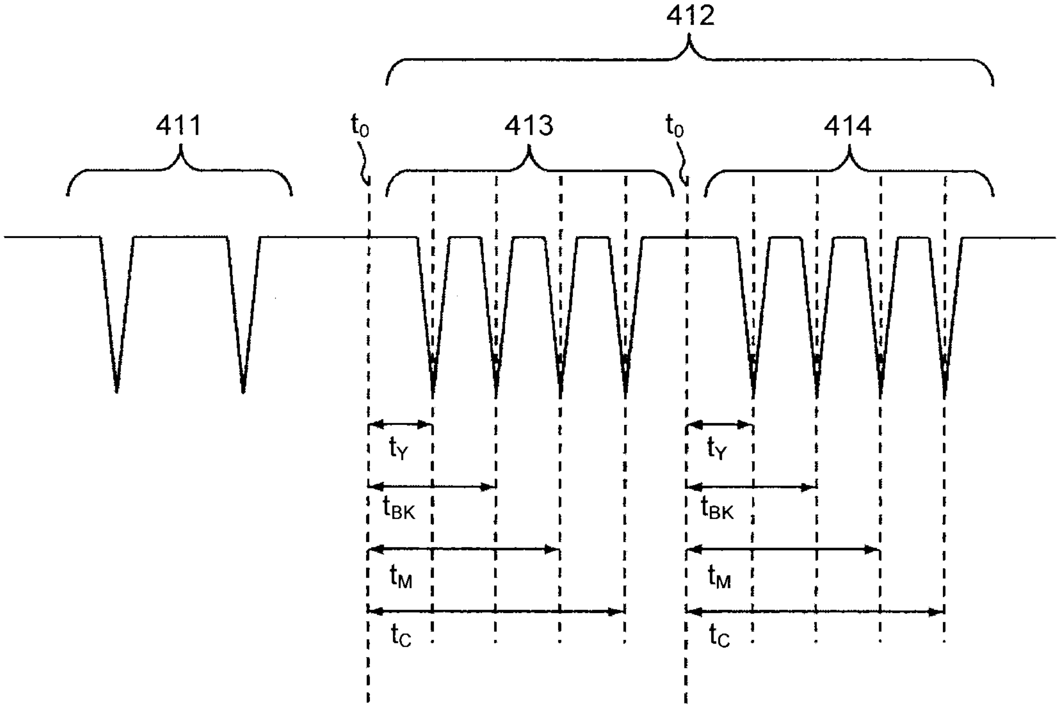
FIG. 8 is a figure illustrating an example of detection timing of the positional deviation correction pattern according to an embodiment of the present invention.

As illustrated in FIG. 7, the positional deviation correction pattern row 401 includes an overall position correction pattern 411 and drum interval correction patterns 412. As illustrated in FIG. 8, the drum interval correction patterns 412 are repeatedly drawn. The overall position correction pattern 411 is a pattern drawn in order to obtain the counted value for correcting the overall deviation of the image in the sub-scanning direction on the basis of the overall timing reference value explained in FIG. 6. The overall position correction pattern 411 is also used to correct the detection timing according to which the sensor control unit 123 detects the drum interval correction pattern 412.

As illustrated in FIG. 7, the overall position correction pattern 411 according to the present embodiment is a line which is drawn by the photosensitive drum 109Y and which is parallel to the main-scanning direction. In the overall position correction using the overall position correction pattern 411, the optical writing device control unit 120 performs correction operation of write start timing on the basis of the reading signal of the start position correction pattern 411 obtained by the pattern detection sensor 117.

More specifically, the overall timing reference value stored in the reference value storage unit 125 is a value serving as a reference of a period from when the LEDA 130Y starts drawing the overall position correction pattern 411 to when the drawn pattern of Y is read by the pattern detection sensor 117 and detected by the sensor control unit 123.

The drum interval correction pattern 412 is a pattern drawn to obtain a counted value for correcting the deviation of the drawing timing in the photosensitive drum 109 of each color on the basis of the timing reference value of each color explained in FIG. 6. As illustrated in FIG. 7, the drum interval correction pattern 412 includes a sub-scanning direction correction pattern 413 and a main-scanning direction correction pattern 414. As illustrated in FIG. 7, the drum interval correction patterns 412 are made by repeating the sub-scanning direction correction pattern 413 and the main-scanning direction correction pattern 414 which are each made up of a set of CMYK color patterns.

The optical writing device control unit 120 performs positional deviation correction of each of the photosensitive drums 109BK, 109M, 109C, 109Y in the sub-scanning direction on the basis of the reading signal of the sub-scanning direction correction pattern 413 obtained by the pattern detection sensor 117, and performs positional deviation correction of each of the above photosensitive drums in the main-scanning direction on the basis of the reading signal of the main-scanning direction correction pattern 414.

Here, the timing reference value of each color stored in the reference value storage unit 125 will be explained with reference to FIG. 8. FIG. 8 is a figure illustrating the detection timing of the drum interval correction pattern 412. As illustrated in FIG. 8, detection periods of the sub-scanning direction correction pattern 413 and the main-scanning direction correction pattern 414 included in the drum interval correction pattern 412 are detection periods starting from detection start timing $t_0$ which is timing before the set of the patterns are read.

As illustrated in FIG. 8, the detection period of the CMYK patterns are $t_C$, $t_{BK}$, $t_M$, and $t_C$. Therefore, the timing reference values of the colors stored in the reference value storage unit 125 are reference values corresponding to $t_C$, $t_{BK}$, $t_M$, and $t_C$. More specifically, the correction value calculating unit 124 calculates a correction value for correcting the light emitting timing of the LEDA 130 on the basis of the difference between the detection periods $t_C$, $t_{BK}$, $t_M$, $t_C$ as illustrated in FIG. 8 and the timing reference values of the colors stored in the reference value storage unit 125.

The overall timing reference value is also used to correct the timing of the detection start timing $t_0$ illustrated in FIG. 8. More specifically, the correction value calculating unit 124 calculates a correction value for correcting the timing of the detection start timing $t_0$ illustrated in FIG. 8 on the basis of difference between the overall timing reference value and the detection timing of the overall position correction pattern 411. Therefore, the accuracy of the detection period of the drum interval correction pattern 412 can be improved.

In this configuration, the gist of the present embodiment is to minimize the correction value calculated by the correction value calculating unit 124, that is, minimize the amount of delay by which the light emission control unit 121 delays the light emission of the LEDA 130 in units of one line cycle. Correction value calculation operation for calculating the correction value which is to be stored in the correction value storage unit 126 by drawing the patterns as illustrated in FIG. 7 will be explained below with reference to the flowchart of FIG. 9.

Figure 9:
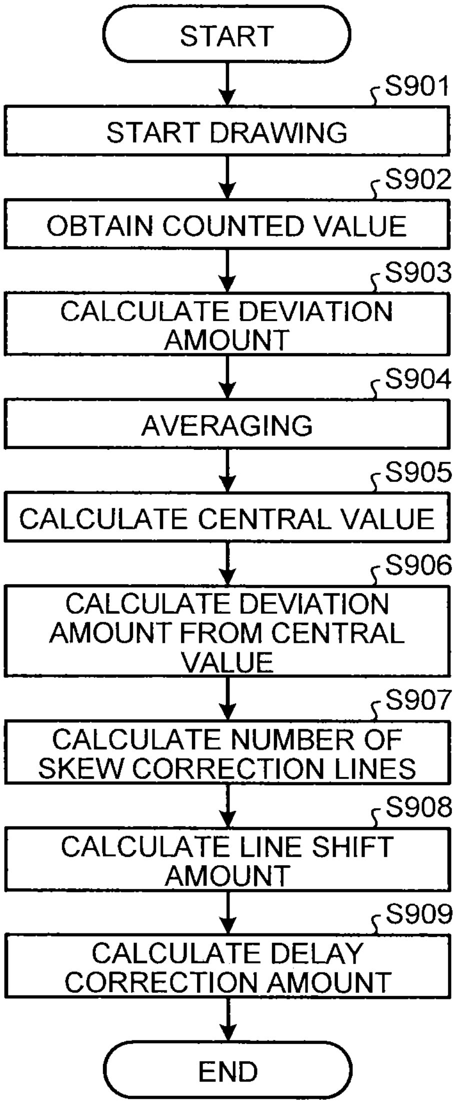
FIG. 9 is a flowchart illustrating a calculation operation of a correction value according to an embodiment of the present invention.

As illustrated in FIG. 9, in the optical writing device control unit 120, the light emission control unit 121 starts to draw the positional deviation correction mark 400 illustrated in FIG. 7 (S901), and accordingly, the count unit 122 starts to count and a toner image developed on the photosensitive drum 109 is transferred onto the conveying belt 105, and is conveyed by the conveying belt 105.

The positional deviation correction mark 400 conveyed by the conveying belt 105 is detected by the pattern detection sensor 117, and the sensor control unit 123 outputs the detection signal. Therefore, the count unit 122 stores the counted value at the timing at which each of the patterns is detected, and outputs the counted value to the correction value calculating unit 124. Accordingly, the correction value calculating unit 124 obtains the counted value (S902). FIG. 10 is a figure illustrating an example of counted values which the correction value calculating unit 124 obtains.

In the information illustrated in FIG. 10, one line represents the counted values of the detection timing of the set of the sub-scanning direction correction patterns 413 and the main-scanning direction correction patterns 414 explained above. For example, "$t_Y$_L1" denotes detection timing of a pattern drawn by the photosensitive drum 109Y among the patterns included in the first set of the sub-scanning direction correction patterns 413, and denotes timing of the detection signal obtained by the sensor device 170 which is indicated at the left in FIG. 7. "$t_Y$_R1" denotes timing of the detection signal obtained by the sensor device 170 which is indicated at the right.

"$t_{BK}$_L2" denotes detection timing of a pattern drawn by the photosensitive drum 109BK among the patterns included in the second set of the sub-scanning direction correction patterns 413, and denotes timing of the detection signal obtained by the sensor device 170 which is indicated at the left in FIG. 7. "$t_{BK}$_R2" denotes timing of the detection signal obtained by the sensor device 170 which is indicated at the right.

As illustrated in FIG. 7, the positional deviation correction mark 400 also includes the main-scanning direction correction pattern 414, but in the present embodiment, for the sake of simplifying the explanation, only the processing for calculating the positional deviation correction value for the sub-scanning direction on the basis of the detection result of the sub-scanning direction correction pattern 143 will be explained.

When the counted values as illustrated in FIG. 10 are obtained, the correction value calculating unit 124 calculates a deviation amount with respect to an ideal position for each of "L", "R" and for each of the sets (S903). That is, in S903, the correction value calculating unit 124 functions as a positional deviation amount obtaining unit. In S903, the correction value calculating unit 124 calculates the deviation amount by subtracting the timing reference value of each color stored in the reference value storage unit 125 from corresponding one of the counted values.

FIG. 11 is a figure illustrating the deviation amounts calculated by the processing of S903. By calculating the difference from the timing reference value of each color, "$d_Y$_L1" is calculated from "$t_Y$_L1", for example. After the deviation amount is calculated by calculating the difference from the reference value for each of the counted values, the correction value calculating unit 124 obtains an average value of all the sets for each of the values of "L", "R" (S904).

In S904, when, for example, the correction value calculating unit 104 derives "$t_Y$_L" which is an average value of the deviation amounts of the patterns which are drawn by the photosensitive drum 109Y and which are detected by the sensor device 170 indicated at the left in FIG. 7, the correction value calculating unit 104 executes the calculation of the following expression (1). It should be noted that "m" in the expression (1) is the total number of sets of the detected patterns.

$$d\gamma\_L = \left(\sum_{i}^{m} d\gamma\_Li\right) \Big/ m \qquad (1)$$

FIG. 12 is a figure illustrating average values of the deviation amounts of all the sets with regard to the values for each of "L", "R" calculated in S904. FIG. 13 illustrates the concept of the average values of the calculated deviation amounts. FIG. 13 illustrates difference between the ideal position and the detection position in a visual manner using the deviation amount of the pattern detected by the sensor device 170 indicated at the left in FIG. 7 as an example.

As illustrated in FIG. 13, the deviation amount of each color may be deviation in the plus direction or may be deviation in the minus direction from the ideal position. Here, the plus direction in the present embodiment means a case where a value obtained by subtracting the reference value from the detection timing is plus, that is, a case where the detection timing is later than the ideal timing. In the example of FIG. 13, the pattern of M is deviated in the plus direction, and the other patterns are deviated in the minus direction.

In conventional positional deviation correction processing, for such deviation amounts, a color that is most deviated in the plus direction is used as a reference, and the timings of the other colors are delayed to match the timing of the color that is most deviated in the plus direction to equate the deviation amounts of colors, as illustrated as a conventional correction position in FIG. 13. In this case, when using FIG. 13 as an example, "$d_M$_L" is deviated in the plus direction, and therefore, the processing is such that the color of M is used as a reference, and the timing of the other colors are delayed.

As a result, "$d_{BK}$_L" is most deviated in the minus direction among "$d_Y$_L", "$d_{BK}$_L", "$d_C$_L", and therefore, the maximum number of lines required in the line memory is the number of lines in the line memory for the color BK, and is the number of lines corresponding to "$d_{BK}$_L−$d_M$_L" which is a difference between "$d_{BK}$_L" and "$d_M$_L". In other words, "$d_{BK}$_L−$d_M$_L" is a summation of absolute values of "$d_{BK}$_L" and "$d_M$_L", positive/negative signs of which are opposite to each other. On the other hand, for the color M, it is not necessary to do delaying processing. Therefore, the line memory provided in the light emission control unit 121 for the color M is useless.

The positional deviation correction processing according to the present embodiment is to solve such an inefficient usage state of resources, and as illustrated as the correction position of this case in FIG. 13, reduces the maximum value of the number of lines which is to be corrected is reduced, and thus reduces the number of needed lines in the line memory by causing the correction to the plus direction and the minus direction be mixed.

More specifically, as illustrated in FIG. 13, a position corresponding to a value obtained by adding the deviation amounts of the color that is most deviated in the plus direction and the color that is most deviated in the minus direction and dividing the summation by two, i.e., a position of "($d_{BK}$_L+$d_M$_L)/2", is defined as a virtual central position (hereinafter referred to as "virtual central line"), and all the colors are corrected to match the virtual central line. In other words, in the positional deviation correction according to the present embodiment, the central value of the deviation amount of the highest value and the deviation amount of the lowest value is obtained as the position of the virtual central line, and the positions are matched while adapting this virtual central line as a reference. Therefore, as illustrated in FIG. 13, the maximum value of the needed correction amount is "($d_{BK}$_L−$d_M$_L)/2" which is half as compared with the case of the conventional correction position, and accordingly, the number of needed lines in the line memory can be reduced.

In the example of FIG. 13, there are both of the deviation in the plus direction and the deviation in the minus direction in a mixed manner, but the direction of deviation may be only any one of the plus direction and the minus direction. Even in such case, the same effects can be obtained by deriving a value obtained by adding the deviation amount of the highest value and the deviation amount of the lowest value and dividing the summation by two.

For such processing, the correction value calculating unit 124 that has finished the processing of S904 obtains a central value of the maximum value and the minimum value for the average values for both of "L", "R" (S905). In other words, in S905, the correction value calculating unit 124 obtains the central value of the distribution range of the average values. This central value is the position of the virtual central line, that is, the position to which the timing of each color is matched.

FIG. 14 is central values obtained for both of "L", "R" according to the processing of S905. In FIG. 14, for example, "$P_V$_L" is a value obtained by dividing, by two, the difference between the maximum value and the minimum value of "$d_Y$_L", "$d_{BK}$_L", "$d_M$_L", and "$d_C$_L". When the central value is thus obtained, the correction value calculating unit 124 subtracts the central value illustrated in FIG. 14 from the average value of the deviation amount of each color for each of "L", "R" illustrated in FIG. 12, thereby obtaining the deviation amount of each color with respect to the central value for each of "L", "R" (S906).

FIG. 15 illustrates deviation amounts with respect to the central value obtained for each of the colors and for each of "L", "R" according to the processing of S906. In FIG. 15, for example, "$\Delta d_Y$_L" is obtained by subtracting "$P_V$_L" of FIG. 14 from "$d_Y$_L" of FIG. 12. "$\Delta d_{BK}$_R" of FIG. 15 is obtained by subtracting "$P_V$_R" of FIG. 14 from "$d_{BK}$_R" of FIG. 12.

After the deviation amount of each color with respect to the central value is obtained for each of "L", "R" in this way, the correction value calculating unit 124 then obtains the number of skew correction lines of each color on the basis of the values of "L", "R" of each color (S907). In S907, the correction value calculating unit 124 obtains the number of skew correction lines $\Delta Skew_i$ (i is either Y, BK, M, C) according to the calculation of the following expression (2) (S907). In the expression (2), $L_{all}$ denotes the entire range in the main-scanning direction. $L_{sens}$ denotes the interval between the right and left sensor devices 170. $\Delta R_f$ denotes an interval per line cycle in the sub-scanning direction.

$$\Delta Skew_i = \frac{(\Delta d_i\_R - \Delta d_i\_L) \times (L_{all} / L_{sens})}{\Delta R_f} \qquad (2)$$

*However, the fractional part is rounded down.

Then, the correction value calculating unit 124 obtains the skew correction remaining difference after the number of skew correction lines calculated in S907 is applied, and obtains a line shift correction amount while using the intermediate point of the skew correction remaining difference as the deviation amount of each color (S908). In S908, the correction value calculating unit 124 obtains a skew correction remaining difference $\Delta d_i$_L' (i is either Y, BK, M, C)

according to the following expression (3). FIG. 16 is a figure schematically illustrating the skew correction remaining difference.

$$\Delta d_i\_L' = \Delta d_i\_L + \Delta Skew_i \times \Delta R_f \quad (3)$$

The skew correction remaining difference is such that, since the number of skew correction lines obtained from the expression (2) is rounded down in units of one line, the skew cannot be completely corrected as illustrated in FIG. 16, and in view of this fact, the skew correction remaining difference is a value derived by obtaining a skew amount that is not finished being corrected as illustrated in the expression (3). In the expression (2), the deviation amount at the "L" side is subtracted using the "R" side as the reference, and therefore, in the expression (3), the skew correction remaining difference is obtained by correcting the "L" side.

Using the value of the skew correction remaining difference thus obtained, the correction value calculating unit 124 obtains, according to the following expression (4), a line shift correction amount $\Delta Shift_i$ (i is either Y, BK, M, C) for correcting the deviation amount of each color with the line shift, and more particularly, with timing correction using the line memory as described above.

$$\Delta Shift_i = \frac{(\Delta d_i\_L' + \Delta d_i\_R)/2}{\Delta R_f} \quad (4)$$

*However, the fractional part is rounded.

The correction of the deviation amount using the line shift can be done only in units of one line, and therefore, the line shift correction amount is rounded in units of one line. "Rounding" referred to herein is processing such that, when the calculation result is positive and includes a fractional part, the fractional part is rounded down, and one is added, and on the other hand, when the calculation result is negative and includes a fractional part, the fractional part is rounded down. The meaning of the processing in which the fractional part of the calculation result of the line shift correction amount $\Delta Shift_i$ is rounded will be explained later.

With the correction using the line shift, a deviation amount which is less than one line cannot be corrected. Therefore, in the present embodiment, the light emission control unit 121 delays the timing, according to which the light emission of the LEDA 130 is controlled, by a time corresponding to an interval less than one line, thus correcting the deviation amount less than one line. For this reason, the correction value calculating unit 124 obtains a light emitting timing delay correction amount which is a correction amount for performing positional deviation correction by delaying the light emitting timing itself of the LEDA 130 (S909). In other words, the light emitting timing delay correction amount is a fine adjustment amount for correcting the timing within a range less than one line cycle.

In S909, the correction value calculating unit 124 performs different calculation in accordance with whether $\Delta Shift_i$ is positive or negative. In a case of a color for which $\Delta Shift_i$ is negative, the correction value calculating unit 124 obtains a light emitting timing delay correction amount $\Delta delay_i$ according to the following expression (5).

The following expression (5) is equivalent to obtaining the fractional part which is rounded down in the expression (4).

$$\Delta delay_i = \frac{(\Delta d_i\_L' + \Delta d_i\_R)/2}{\Delta R_f} - \Delta Shift_i \quad (5)$$

On the other hand, in a case of a color of which $\Delta Shift_i$ is positive, the correction value calculating unit 124 obtains a light emitting timing delay correction amount $\Delta delay_i$ according to the following expression (6). The following expression (6) is equivalent to the amount of the fractional part that is rounded up in the expression (4). The meaning of the expression (5), (6) will be explained later when the processing in which the fractional part of the calculation result of the line shift correction amount $\Delta Shift_i$ is rounded is explained.

$$\Delta delay_i = \Delta Shift_i - \frac{(\Delta d_i\_L' + \Delta d_i\_R)/2}{\Delta R_f} \quad (6)$$

In this way, in S905 to S909, the correction value calculating unit 124 functions as a correction amount calculating unit. With such processing, various kinds of correction values as illustrated in FIG. 17 are calculated and stored to the correction value storage unit 126, and thus, the calculation operation of the correction value in the positional deviation correction operation is finished. As explained in FIG. 13, the correction value thus calculated includes both of a value for correcting the timing in the plus direction, i.e., direction for delaying the timing, and a value for correcting the timing in the minus direction, i.e., direction for advancing the timing.

In contrast, what can be done with the positional deviation correction using the line shift of the light emission control unit 121 is only the correction in the direction for delaying the light emitting timing, i.e., the plus direction. In order to enable correction in the minus direction described above, the light emission control unit 121 according to the present embodiment delays the timing for starting to obtain, from the engine control unit 31, drawing information about colors other than a color which is required to be corrected in the minus direction, thus making it possible to make correction in the minus direction.

Figure 18A:
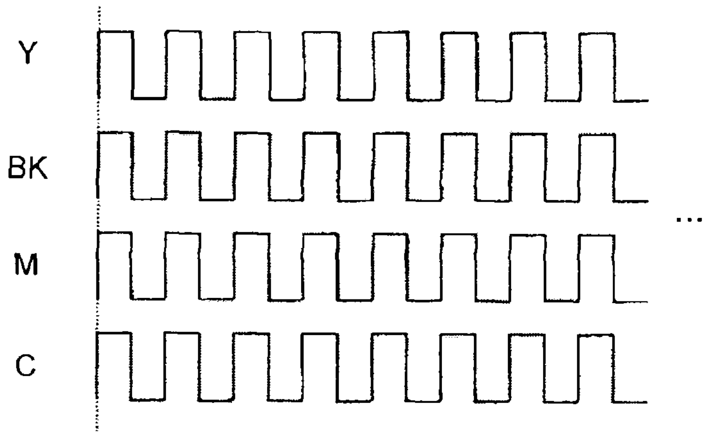
FIGS. 18A to 18C are timing charts illustrating the line cycle of an optical writing control device according to an embodiment of the present invention.

FIGS. 18A to 18D are timing charts illustrating line cycle signal of the optical writing with the optical writing device control unit 120, and illustrates timing according to which light emission of the LEDA 130 is actually controlled. FIG. 18A is a figure illustrating timing in a case where no positional deviation correction is made. As explained in FIGS. 3, 4, the arrangement of the photosensitive drum 109 of each color is deviated in the sub-scanning direction, and therefore, the start timing of the line cycle signal illustrated in FIGS. 18A to 18C may also be deviated for each color in accordance with the arrangement of the photosensitive drum 109.

Figure 18B:
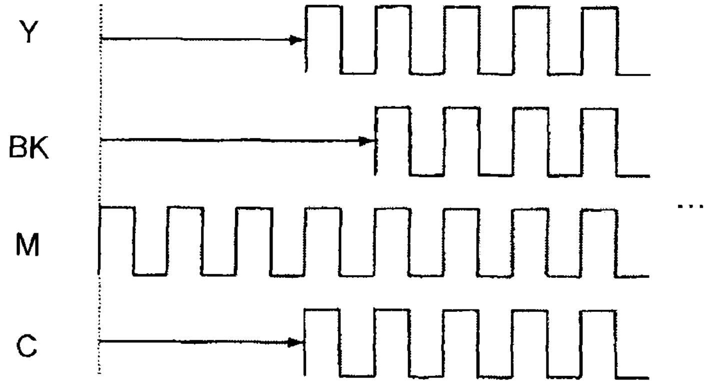

FIG. 18B is an example where the timing is corrected in accordance with a conventional correction method. FIG. 18B illustrates the correction amount of timing, assuming that the positional deviation as explained in FIG. 13 occurs. Arrows of solid lines as illustrated in FIG. 18B are timing corrections with the line shift correction using the line memory provided in the light emission control unit 121. In FIG. 18B, the light emission control for BK is started with a delay of four cycles with respect to M, and therefore, the line memory for at least four lines is needed.

Figure 18C:
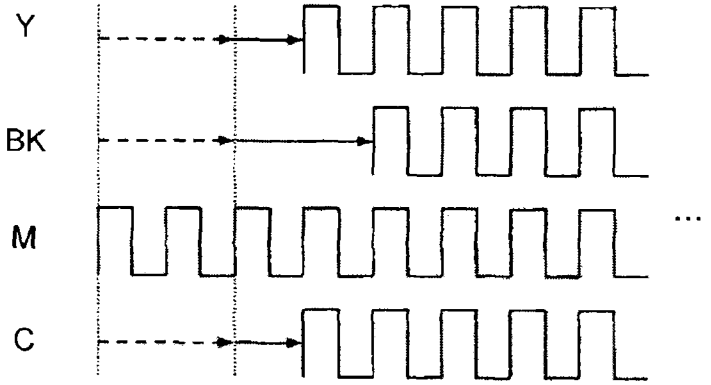

In contrast, FIG. 18C is an example in a case where the timing is corrected according to the method of the present embodiment. Arrows indicated by broken lines in FIG. 18C denote timing that is corrected by delaying timing at which the light emission control unit 121 starts to obtain the drawing information from the engine control unit 31. In FIG. 18C, start of obtaining the drawing information is delayed by two lines, and the remaining correction amount is done with the line shift correction. Therefore, the line memory for as many as two lines is needed, from which it can be seen that the number of lines needed is reduced.

Figure 19:
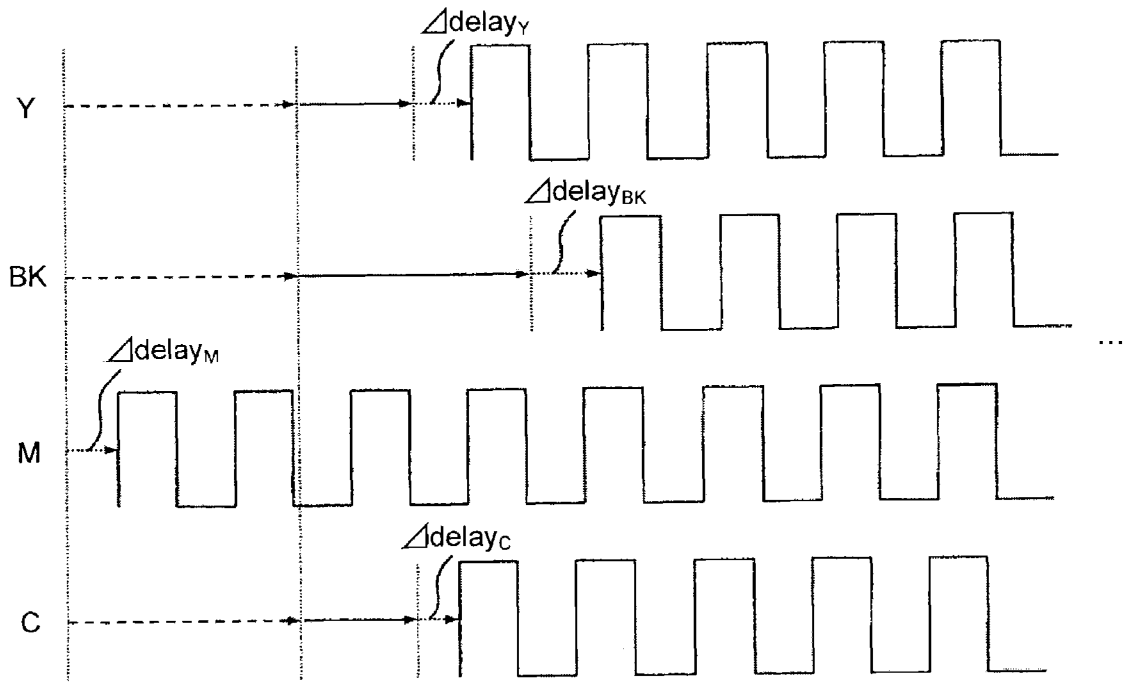
FIG. 19 is a figure illustrating an example of light emitting timing delay control according to an embodiment of the present invention.

FIG. 19 is a figure illustrating a state where the light emitting timing delay correction amount is further applied to the state of FIG. 18C. Here, the meaning of the expression (5), (6) and the processing in which the fractional part of the calculation result of the line shift correction amount $\Delta Shift_i$ is rounded will be explained.

As described above, in the image obtaining timing shift processing for delaying the timing at which the light emission control unit 121 starts to obtain drawing information from the engine control unit 31 and line shift processing using the line memory of the light emission control unit 121 (hereinafter collectively referred to as line unit correction processing), the line cycle is used as the unit, and it is impossible to perform correction with a higher accuracy than that. Therefore, further detailed correction is done using the light emitting timing delay correction amount as explained above.

In contrast, in order to achieve correction just in accordance with the positional deviation amount with regard to a color such as M in FIG. 19 for which drawing information is obtained at earlier timing than the other colors, a desired positional deviation amount is passed in units of one line, and the amount that is passed is corrected with the light emitting timing delay correction amount as illustrated in FIG. 19.

With regard to a color such as M in FIG. 19 for which drawing information is obtained at timing earlier than the other colors, the calculation result of the expression (4) is positive, and therefore, the correction value that is passed in units of one line as described above is obtained by rounding up the fractional part of the calculation result. Then, the calculation of the expression (6) is used to calculate the passed portion, i.e., the amount of rounding up.

On the other hand, in order to achieve correction just in accordance with the positional deviation amount with regard to colors such as Y, BK, C in FIG. 19 for which the line shift processing is performed, the line shift is performed up to before a desired positional deviation amount in units of one line, and the insufficient correction amount is corrected with the light emitting timing delay correction amount as illustrated in FIG. 19.

With regard to the colors such as Y, BK, C in FIG. 19 for which the line shift processing is performed, the calculation result of the expression (4) is negative, and therefore, the correction up to before a desired positional deviation amount in units of one line is obtained by rounding down the fractional part of the calculation result, i.e., performing the rounding processing thereof. Then, in order to calculate the insufficient correction amount, the calculation of the above expression (5) is used. With such processing, preferable correction processing as illustrated in FIG. 19 can be achieved.

Figure 20:
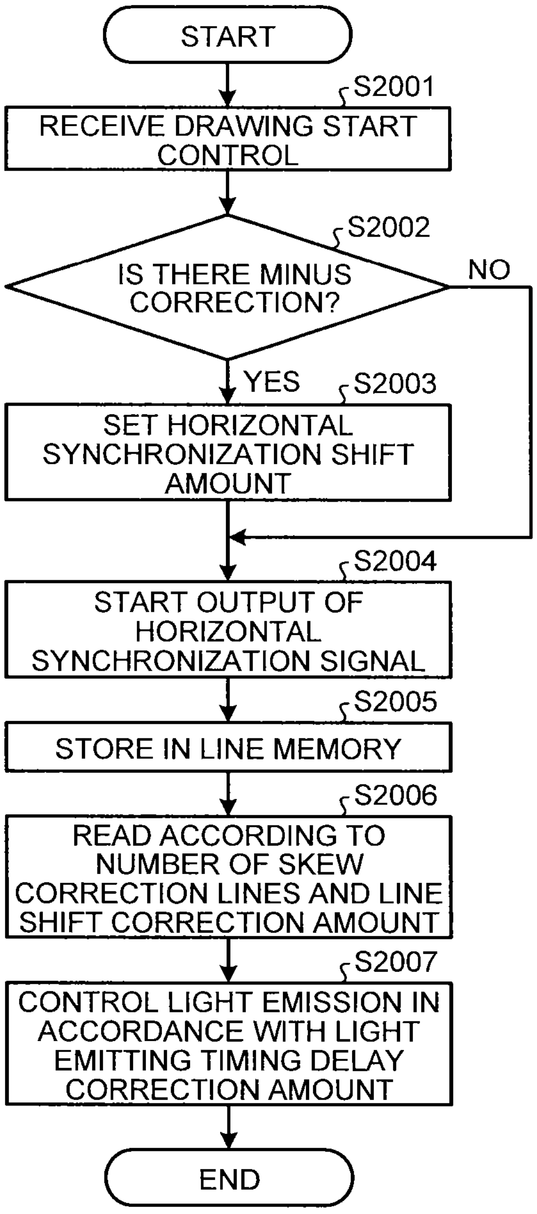
FIG. 20 is a flowchart illustrating optical writing control operation according to an embodiment of the present invention.

Subsequently, operation of the optical writing device control unit 120 when the positional deviation correction as illustrated in FIG. 19 is performed will be explained with reference to the flowchart of FIG. 20. As illustrated in FIG. 20, when the optical writing device control unit 120 receives control for start of the drawing from the engine control unit 31 (S2001), the optical writing device control unit 120 looks up the line shift correction amount among the correction values stored in the correction value storage unit 126, and determines whether there is any value that requires minus correction, i.e., correction for delaying the timing at which the drawing information of other colors is obtained, such as M in FIG. 19 (S2002).

As described above, because the line shift correction amount for the color such as M in FIG. 19 is calculated as a plus value, the minus correction referred to here means that it is necessary to make correction in the minus direction in order to correct that.

As a result of S2002, when there is the minus correction (S2002/YES), the optical writing device control unit 120 sets a minus line shift correction amount (S2003). This is a parameter for shifting start timing of a horizontal synchronization signal which is output to the engine control unit 31 so that the light emission control unit 121 obtains drawing information from the engine control unit 31, and is set as a horizontal synchronization shift amount.

When the horizontal synchronization shift amount is set, the light emission control unit 121 starts output of the horizontal synchronization signal to the engine control unit 31 (S2004), and starts reception of the drawing information. On this occasion, with regard to the color for which the horizontal synchronization shift amount has been set, the light emission control unit 121 delays the output start timing of the horizontal synchronization signal in accordance with the setting value. More specifically, this can be achieved by masking the horizontal synchronization signal for the setting value of the horizontal synchronization shift amount.

It should be noted that when there is no minus correction in S2002, the optical writing device control unit 120 omits the processing of S2003 and proceeds to the processing of S2004. When the output of the horizontal synchronization signal is started and thus the light emission control unit 121 starts to obtain the drawing information, the light emission control unit 121 stores the received information in the line memory provided therein (S2005).

When the drawing information is stored in the line memory for each main scanning line, the light emission control unit 120 reads the drawing information from the line memory in accordance with the number of skew correction lines and the line shift correction amount stored in the correction value storage unit 126 (S2006). Further, the light emission of the LEDA 130 is controlled while delaying the light emitting timing in accordance with the light emitting timing delay correction amount stored in the correction value storage unit 126 (S2007). With such processing, the positional deviation correction processing as illustrated in FIG. 19 is achieved.

As described above, according to the optical writing device control unit 120 of the present embodiment, the central value of the positional deviation amounts of the colors is obtained, and the positional deviation between the colors, i.e., the deviation of the colors, is corrected by adjusting the positional deviation of each color in accordance with the central value. Therefore, the positional deviation correction amount according to the conventional positional deviation correction method which is illustrated as, e.g., "$d_{BK}$_L−$d_M$_L" in FIG. 13, is reduced by half, which is illustrated as "($d_{BK}$_L−$d_M$_L)/2" in FIG. 13, and accordingly, the number of needed lines in the line memory can be reduced, and therefore, the cost of the optical writing device control unit 120 can be reduced and the efficiency of the usage of resources therein can be enhanced.

According to the present embodiment, in view of that the unit of processing that can be treated in the image obtaining timing shift processing and the line shift processing explained above is the unit of one line cycle and more accurate correction cannot be performed, the light emission delay control is performed to delay the light emitting timing of the LEDA 130 by a predetermined time which is less than one line cycle, whereby the fine positional deviation correction less than one line cycle is enabled.

For this reason, in the image obtaining timing shift processing explained above, the fractional part of the calculated positional deviation correction amount is rounded, i.e., a portion less than one line is rounded, and the desired positional deviation correction position is achieved, i.e., the correction passing the central value obtained in S905 of FIG. 9 is performed, and the passed portion is corrected with the light emission delay control.

In the line shift processing, the fractional part of the calculated positional deviation correction amount is rounded down, i.e., a portion less than one line is rounded down, and the desired positional deviation correction position is achieved, i.e., the correction is performed up to before the central value obtained in S905 of FIG. 9, and the insufficient portion is corrected with the light emission delay control. With such processing, the fine correction less than one line can be performed.

As explained in FIG. 7, the overall position of the drawn image, i.e., the position of the image on the sheet ultimately transferred onto the sheet is achieved by the correction using the overall position correction pattern 411. However, when the correction mode according to the present embodiment as illustrated in FIG. 19, i.e., the correction in accordance with the central value of the deviation amount is performed, the overall position of the image is deviated.

Therefore, in the present embodiment, the optical writing control unit 120 adjusts the timing of feeding of the sheet with the registration roller 103 on the basis of various kinds of correction values stored in the correction value storage unit 126, thus adjusting the ultimate transfer position of the image. The adjustment of the timing for feeding the sheet with the registration roller 103 can be done easily than the adjustment of the timing of the image-forming output as explained above. Therefore, with the image forming apparatus 1 according to the present embodiment, the transfer position of the image is not deviated on the sheet, and the positional deviation correction can be performed while reducing the number of lines in the line memory.

In the above embodiment, for example, it is explained that the LEDA using LEDs as light emitting devices is used as the light source for exposing the photosensitive drum 109 and forming the electrostatic latent image. This is only an example, and the embodiment can be similarly applied when an array-form light source in which light emitting devices are arranged in the main-scanning direction is used. Examples of light emitting devices used in this case include various kinds of light emitting devices such as an organic EL (Electro Luminescence) device, a laser diode device, and a field emission cold cathode device, and the same effects as the above can also be obtained.

According to the embodiment, in an electrophotography image forming apparatus having multiple light sources, the number of lines in a line memory provided in an optical writing control device for controlling a light source can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical writing control device that forms electrostatic latent images on image carriers by controlling light sources exposing the image carriers, the optical writing control device comprising:

a pixel information obtaining unit which obtains pixel information about pixels constituting an image which is to be formed and output, from a control unit of an image forming apparatus main body, and stores the pixel information in a storage medium;

a light emission control unit which controls light emission of each of the multiple light sources which are provided for respective different colors, on the basis of the obtained information about the pixels, and exposes the multiple image carriers which are provided for the respective different colors;

a detection signal obtaining unit which obtains a detection signal of a sensor that detects an image in a conveying path on which the image obtained by developing the electrostatic latent images formed on the image carriers is transferred and conveyed;

a detection timing obtaining unit which obtains, on the basis of the obtained detection signal, detection timing of a positional deviation correction pattern used to correct a positional deviation in a sub-scanning direction between the different colors of the image that is formed by developing the electrostatic latent images formed using the multiple image carriers;

a positional deviation amount obtaining unit which obtains a positional deviation amount in the sub-scanning direction for each of the different colors, on the basis of a difference between a reference value determined in advance and the detection timing of the positional deviation correction pattern obtained for a corresponding color; and a correction amount calculating unit which calculates a central value of a distribution range of the positional deviation amounts in the sub-scanning direction obtained for the different colors, and calculates a correction amount for each of the different colors on the basis of a difference between the calculated central value and the positional deviation amount in the sub-scanning direction obtained for a corresponding color, wherein the light emission control unit controls light emission of each of the multiple light sources on the basis of the calculated correction amount of each of the different colors, when a correction amount indicates that light emitting timing of a light source is to be delayed, the light emission control unit delays the light emitting timing of the light source by delaying reading timing of the pixel information stored in the storage medium; and when a correction amount indicates that light emitting timing of a light source for a color is to be advanced, the light emission control unit delays timing at which the pixel information about colors other than the color starts to be obtained from the control unit of the image forming apparatus main body, thus relatively advancing the light emitting timing of the light source for the color.

2. The optical writing control device according to claim 1, wherein the correction amount calculating unit calculates the correction amount in units of number of lines, on the basis of a line cycle in which light emission control of the light source for each main scanning line is performed, and a difference between the calculated central value and the positional deviation amount in the sub-scanning direction obtained for each of the difference colors.

3. The optical writing control device according to claim 2, wherein the correction amount calculating unit calculates a correction amount in units of the number of lines and a fine adjustment amount less than one line cycle, on the basis of the line cycle in which light emission control of the light source for each main scanning line is performed, and a difference between the calculated central value and the positional deviation amount in the sub-scanning direction obtained for each of the difference colors, and the light emission control unit executes processing to delay the reading timing of the pixel information stored in the storage medium on the basis of the correction amount in units of the number of lines and processing to delay timing at which the pixel information about colors other than the color starts to be obtained from the control unit of the image forming apparatus main body, as well as delays timing at which the light source is caused to emit light, by the fine adjustment amount less than the line cycle.

4. The optical writing control device according to claim 3, wherein the correction amount calculating unit calculates a value obtained by dividing, by a value corresponding to the line cycle, a difference between the calculated central value and the positional deviation amount in the sub-scanning direction obtained for each of the different colors, and when the calculated value indicates that the light emitting timing of the light source is to be delayed, the correction amount calculating unit extracts an integer portion of the value to use it as the correction amount in units of the number of lines, and extracts a fractional part of the value to use it as the fine adjustment amount, and when the calculated value indicates that the light emitting timing of the light source is to be advanced, the correction amount calculating unit rounds up the value to obtain a integer portion and uses the integer portion as the correction amount in units of the number of lines, and uses a fractional part of the value that is rounded up as the fine adjustment amount.

5. The optical writing control device according to claim 1, wherein the detection signal obtaining unit obtains a detection signal of a sensor detecting an image at each of two positions which are different in the main-scanning direction, the positional deviation amount obtaining unit obtains positional deviation amounts in the sub-scanning direction at the two positions on the basis of detection timing obtained by detecting the image at the two positions which are different in the main-scanning direction, the correction amount calculating unit calculates a skew amount of the image on the basis of the positional deviation amounts in the sub-scanning direction at the two positions, and the correction amount calculating unit calculates the correction amount for each of the different colors on the basis of the calculated skew amount and a difference between the calculated central value and the positional deviation amount in the sub-scanning direction obtained for each of the different colors.

6. The optical writing control device according to claim 1 further comprises a paper feeding timing control unit which controls timing at which a sheet is fed by a paper feeding unit feeding the sheet to a transfer position where the image formed by developing the electrostatic latent images is transferred onto the sheet, on the basis of the calculated correction amount for each of the different colors.

7. An image forming apparatus comprising an optical writing control device that forms electrostatic latent images on image carriers by controlling light sources exposing the image carriers, the optical writing control device comprising:

a pixel information obtaining unit which obtains pixel information about pixels constituting an image which is to be formed and output, from a control unit of an image forming apparatus main body, and stores the pixel information in a storage medium;

a light emission control unit which controls light emission of each of the multiple light sources which are provided for respective different colors, on the basis of the obtained information about the pixels, and exposes the multiple image carriers which are provided for the respective different colors;

a detection signal obtaining unit which obtains a detection signal of a sensor that detects an image in a conveying path on which the image obtained by developing the electrostatic latent images formed on the image carriers is transferred and conveyed;

a detection timing obtaining unit which obtains, on the basis of the obtained detection signal, detection timing of a positional deviation correction pattern used to correct a positional deviation in a sub-scanning direction between the different colors of the image that is formed by developing the electrostatic latent images formed using the multiple image carriers;

a positional deviation amount obtaining unit which obtains a positional deviation amount in the sub-scanning direction for each of the different colors, on the basis of a difference between a reference value determined in advance and the detection timing of the positional deviation correction pattern obtained for a corresponding color; and a correction amount calculating unit which calculates a central value of a distribution range of the positional deviation amounts in the sub-scanning direction obtained for the different colors, and calculates a correction amount for each of the different colors on the basis of a difference between the calculated central value and the positional deviation amount in the sub-scanning direction obtained for a corresponding color, wherein the light emission control unit controls light emission of each of the multiple light sources on the basis of the calculated correction amount of each of the different colors, when a correction amount indicates that light emitting timing of a light source is to be delayed, the light emission control unit delays the light emitting timing of the light source by delaying reading timing of the pixel information stored in the storage medium; and when a correction amount indicates that light emitting timing of a light source for a color is to be advanced, the light emission control unit delays timing at which the pixel information about colors other than the color starts to be obtained from the control unit of the image forming apparatus main body, thus relatively advancing the light emitting timing of the light source for the color.

8. An optical writing control method of forming electrostatic latent images on image carriers by controlling light sources exposing the image carriers, the optical writing control method comprising:

obtaining a detection signal of a sensor that detects an image, in a conveying path on which the image obtained by developing the electrostatic latent images formed on the image carriers is transferred and conveyed;

obtaining, on the basis of the obtained detection signal, detection timing of a positional deviation correction pattern used to correct a positional deviation in a sub-scanning direction between different colors of the image that is formed by developing the electrostatic latent images formed on the multiple image carriers provided for the different colors;

obtaining a positional deviation amount in the sub-scanning direction for each of the different colors, on the basis of a difference between a reference value determined in advance and the detection timing of the positional deviation correction pattern obtained for a corresponding color; and calculating a central value of a distribution range of the positional deviation amounts in the sub-scanning direction obtained for the different colors, and calculates a correction amount for each of the different colors on the basis of a difference between the calculated central value and the positional deviation amount in the sub-scanning direction obtained for a corresponding color, wherein when a correction amount indicates that light emitting timing of a light source is to be delayed, the light emitting timing of the light source is delayed by delaying reading timing of pixel information stored in the storage medium used to obtain and store pixel information about pixels constituting the image which is to be formed and output, and when the correction amount indicates that light emitting timing of a light source for a color is to be advanced, timing at which the pixel information about colors other than the color starts to be stored in the storage medium is delayed, and thus the light emitting timing of the light source for the color is relatively advanced.

* * * * *